(12) United States Patent
Shimada et al.

(10) Patent No.: US 12,503,778 B2
(45) Date of Patent: Dec. 23, 2025

(54) ELECTROCHEMICAL REACTION DEVICE, METHOD OF REDUCING CARBON DIOXIDE, AND METHOD OF PRODUCING CARBON COMPOUNDS

(71) Applicant: HONDA MOTOR CO., LTD., Tokyo (JP)

(72) Inventors: Yuta Shimada, Wako (JP); Hiroshi Oikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 971 days.

(21) Appl. No.: 17/681,866

(22) Filed: Feb. 28, 2022

(65) Prior Publication Data

US 2022/0282384 A1    Sep. 8, 2022

(30) Foreign Application Priority Data

Mar. 4, 2021    (JP) ................................. 2021-034384

(51) Int. Cl.
*C25B 3/25* (2021.01)
*C25B 3/26* (2021.01)
(Continued)

(52) U.S. Cl.
CPC .................. *C25B 3/26* (2021.01); *C25B 9/17* (2021.01); *C25B 9/65* (2021.01); *C25B 11/00* (2013.01); *C25B 15/08* (2013.01)

(58) Field of Classification Search
CPC .... C25B 3/26; C25B 9/17; C25B 9/65; C25B 11/00; C25B 15/08
See application file for complete search history.

(56) References Cited

U.S. PATENT DOCUMENTS

| | | | |
|---|---|---|---|
| 4,673,473 A | | 6/1987 | Ang et al. |
| 2013/0122382 A1 | | 5/2013 | Mizuhata et al. |

(Continued)

FOREIGN PATENT DOCUMENTS

| | | |
|---|---|---|
| CN | 103003199 | 3/2013 |
| CN | 103119017 | 5/2013 |

(Continued)

OTHER PUBLICATIONS

Chinese Office Action for Chinese Patent Application No. 202210164416.1 mailed Jul. 7, 2023.
(Continued)

*Primary Examiner* — Zulmariam Mendez
(74) *Attorney, Agent, or Firm* — Amin, Turocy & Watson, LLP

(57) ABSTRACT

An object is to provide an electrochemical reaction device in which unreacted carbon dioxide gas is less likely to be mixed in and the purity of carbon compounds generated by reduction can be improved, a method of reducing carbon dioxide using the same, and a method of producing carbon compounds. In an electrochemical reaction device 100 that electrochemically reduces carbon dioxide, a first reaction unit 110, and a second reaction unit 120 provided on a downstream side of the first reaction unit are provided, the first reaction unit 110 includes a first liquid flow path 113 in which an inlet and an outlet between the first cathode 111 and the first anode 112 are closed in an openable and closable manner, and a first gas flow path 114 in which an inlet and an outlet on a side of the first cathode 111 opposite to the first anode 112 are closed in an openable and closable manner, and the second liquid flow path 123 for supplying an electrolyte from the first liquid flow path 113, in which an inlet and an outlet are closed in an openable and closable
(Continued)

manner, is provided between a second cathode 121 and a second anode 122 of the second reaction unit 120.

4 Claims, 5 Drawing Sheets

(51) Int. Cl.
*C25B 9/17* (2021.01)
*C25B 9/65* (2021.01)
*C25B 11/00* (2021.01)
*C25B 15/08* (2006.01)

(56) References Cited

U.S. PATENT DOCUMENTS

| | | |
|---|---|---|
| 2018/0265440 A1 | 9/2018 | Kudo et al. |
| 2018/0274109 A1 | 9/2018 | Kudo et al. |
| 2019/0078222 A1 | 3/2019 | Baldauf et al. |
| 2019/0127865 A1* | 5/2019 | Li .................... C25B 3/26 |
| 2019/0233957 A1 | 8/2019 | Jeanty et al. |
| 2020/0378015 A1* | 12/2020 | Hanebuth ............ C25B 15/087 |

FOREIGN PATENT DOCUMENTS

| | | |
|---|---|---|
| CN | 108570690 | 9/2018 |
| CN | 108624905 | 10/2018 |
| DE | 102017213471 | 2/2019 |
| EP | 3725914 | 10/2020 |
| EP | 3831982 | 6/2021 |
| JP | 2013-544957 | 12/2013 |
| JP | 2017-031467 | 2/2017 |
| JP | 2019-167556 | 10/2019 |
| WO | 2012/040503 | 3/2012 |
| WO | 2018/232515 | 12/2018 |
| WO | 2019/025092 | 2/2019 |
| WO | 2020/121556 | 6/2020 |
| WO | 2020/212139 | 10/2020 |

OTHER PUBLICATIONS

Japanese Office Action for Japanese Patent Application No. 2021-034384 mailed Jul. 26, 2022.
Strong alkali examples, Google search (2025).

* cited by examiner

ELECTROCHEMICAL REACTION DEVICE, METHOD OF REDUCING CARBON DIOXIDE, AND METHOD OF PRODUCING CARBON COMPOUNDS

BACKGROUND OF THE INVENTION

Field of the Invention

The present invention relates to an electrochemical reaction device, a method of reducing carbon dioxide, and a method of producing carbon compounds.

Description of Related Art

The technology for obtaining useful substances from carbon dioxide as a raw material is a promising technology that has a potential to achieve carbon neutrality. In particular, the technology of electrochemically reducing carbon dioxide is very useful. Patent Document 1 discloses a technology in which a catalyst layer is formed on the side of the gas diffusion layer which is in contact with an electrolyte using a carbon dioxide reduction catalyst to serve as a cathode, and carbon dioxide gas is supplied from a side of the gas diffusion layer opposite to the catalyst layer to electrochemically reduce the carbon dioxide.

PATENT DOCUMENTS

[Patent Document 1] PCT International Publication No. 2018/232515

SUMMARY OF THE INVENTION

However, in the technology of supplying carbon dioxide gas to the cathode in the related art as in Patent Document 1, unreacted carbon dioxide gas is likely to be mixed with a gaseous carbon compound such as ethylene generated by reducing carbon dioxide. Therefore, when the obtained carbon compound is used, it is necessary to separate off the unreacted carbon dioxide gas, which increases the cost and deteriorates the energy efficiency. From this, it can be said that it is significant from the viewpoint of cost and energy saving to develop an electrochemical reaction device in which the unreacted carbon dioxide gas is less likely to be mixed with the carbon compound generated by the reduction.

An object of the present invention is to provide an electrochemical reaction device in which unreacted carbon dioxide gas is less likely to be mixed in and the purity of carbon compounds generated by reduction can be improved, a method of reducing carbon dioxide, and a method of producing carbon compounds.

The present invention has adopted the following aspects.

(1) According to an aspect of the present invention, there is provided an electrochemical reaction device (for example, an electrochemical reaction device 100 of the embodiment) that electrochemically reduces carbon dioxide, including a first reaction unit (for example, a first reaction unit 110 of the embodiment); and a second reaction unit (for example, a second reaction unit 120 of the embodiment) provided on a downstream side of the first reaction unit, in which the first reaction unit includes a first cathode (for example, a first cathode 111 of the embodiment), a first anode (for example, a first anode 112 of the embodiment), a first liquid flow path (for example, a first liquid flow path 113 of the embodiment) provided between the first cathode and the first anode for supplying an electrolyte composed of a strong alkaline aqueous solution, a first gas flow path (for example, a first gas flow path 114 of the embodiment) provided on a side of the first cathode opposite to the first anode for supplying carbon dioxide gas, a first liquid flow path closing means (for example, a first liquid flow path closing means 116 of the embodiment) for closing an inlet and an outlet of the first liquid flow path in an openable and closable manner, and a first gas flow path closing means (for example, a first gas flow path closing means 117 of the embodiment) for closing an inlet and an outlet of the first gas flow path in an openable and closable manner, and the second reaction unit includes a second cathode (for example, a second cathode 121 of the embodiment), a second anode (for example, a second anode 122 of the embodiment), a second liquid flow path (for example, a second liquid flow path 123 of the embodiment) provided between the second cathode and the second anode for supplying the electrolyte from the first liquid flow path, a second gas flow path (for example, a second gas flow path 124 of the embodiment) provided on a side of the second cathode opposite to the second anode, a second liquid flow path closing means (for example, a second liquid flow path closing means 126 of the embodiment) for closing an inlet and an outlet of the second liquid flow path in an openable and closable manner, and a second gas flow path closing means (for example, a second gas flow path closing means 127 of the embodiment) for closing an inlet and an outlet of the second gas flow path in an openable and closable manner.

(2) According to another aspect of the present invention, there is provided a method of electrochemically reducing carbon dioxide, the method including: a step of electrochemically reducing carbon dioxide gas and dissolving unreacted carbon dioxide gas in an electrolyte in a state where the electrolyte composed of a strong alkaline aqueous solution is accommodated in a first liquid flow path in which an inlet and an outlet between a first cathode and a first anode are closed, and the carbon dioxide gas is accommodated in a first gas flow path in which an inlet and an outlet on a side of the first cathode opposite to the first anode is closed; and a step of electrochemically reducing dissolved carbon dioxide in the electrolyte in a second liquid flow path by moving the electrolyte in which carbon dioxide dissolves from the first liquid flow path to the second liquid flow path between a second cathode and a second anode.

(3) An average value of voltages applied between the first cathode and the first anode during the reduction of the carbon dioxide gas may be set to be lower than the average value of voltages applied between the second cathode and the second anode during the reduction of the dissolved carbon dioxide.

(4) According to still another aspect of the present invention, there is provided a method of producing carbon compounds by electrochemically reducing carbon dioxide by using the method of reducing carbon dioxide according to (2) or (3).

According to the aspects of (1) to (4), it is possible to provide an electrochemical reaction device in which unreacted carbon dioxide gas is less likely to be mixed in and the purity of carbon compounds generated by reduction can be improved, a method of reducing carbon dioxide, and a method of producing carbon compounds.

DETAILED DESCRIPTION OF THE INVENTION

Figure 1:
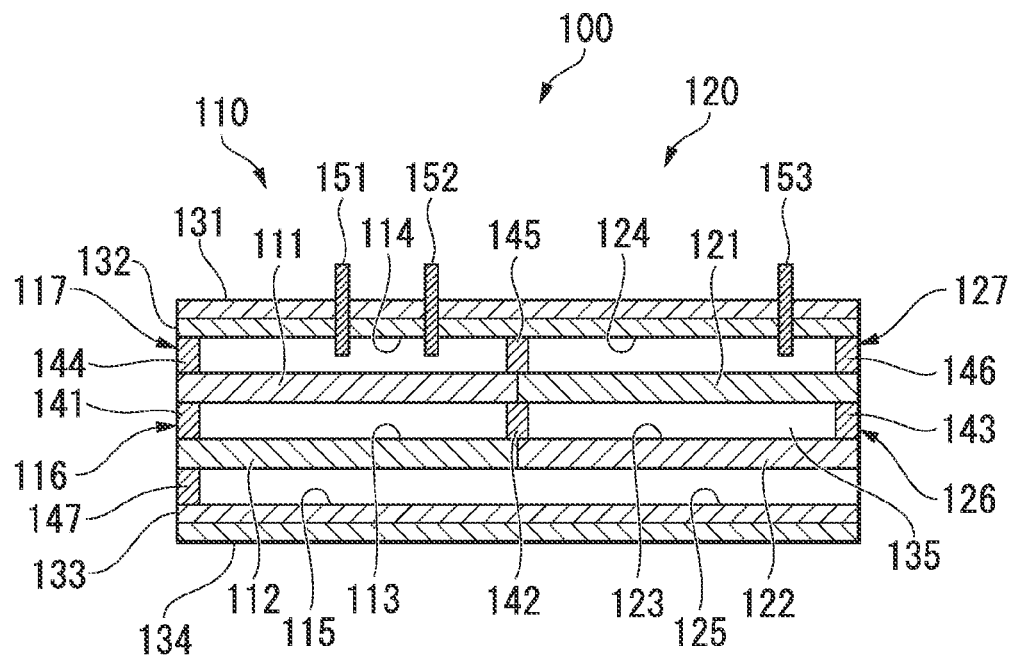
FIG. 1 is a sectional view illustrating an electrochemical reaction device according to an embodiment.

Hereinafter, embodiments of the present invention will be described with reference to the drawings. In addition, the dimensions and the like in the drawings exemplified in the following description are examples, and the present invention is not necessarily limited thereto, and the present invention can be appropriately changed without changing the gist thereof.

[Electrochemical Reaction Device]

An electrochemical reaction device 100 according to an aspect of the present invention exemplified in FIG. 1 is a device for electrochemically reducing carbon dioxide. The electrochemical reaction device 100 includes a first reaction unit 110 and a second reaction unit 120 provided on the downstream side of the first reaction unit 110.

The first reaction unit 110 includes a first cathode 111, a first anode 112, a first liquid flow path 113, a first gas flow path 114, a first gas discharge path 115, a first liquid flow path closing means 116, and a first gas flow path closing means 117. The second reaction unit 120 includes a second cathode 121, a second anode 122, a second liquid flow path 123, a second gas flow path 124, a second gas discharge path 125, a second liquid flow path closing means 126, and a second gas flow path closing means 127.

In the electrochemical reaction device 100, a power supplying body 131, a gas flow path structure 132, the first cathode 111 and the second cathode 121, a liquid flow path structure 135, the first anode 112 and the second anode 122, a gas flow path structure 133, and a power supplying body 134 are laminated in this order. The first cathode 111 and the first anode 112 are arranged apart from each other such that the surfaces thereof face each other. Similarly, the second cathode 121 and the second anode 122 are arranged apart from each other such that the surfaces thereof face each other.

A groove is formed on the side of the gas flow path structure 132 where the first cathode 111 and the second cathode 121 are arranged, and the first cathode 111 and the second cathode 121 are arranged so as to be aligned in the length direction of the groove. Accordingly, a part of the groove of the gas flow path structure 132 and a part surrounded by the first cathode 111 become the first gas flow path 114, and the rest of the groove of the gas flow path structure 132 and a part surrounded by the second cathode 121 become the second gas flow path 124. The first gas flow path 114 and the second gas flow path 124 communicate with each other.

A groove is formed on the side of the gas flow path structure 133 where the first anode 112 and the second anode 122 are arranged, and the first anode 112 and the second anode 122 are arranged so as to be aligned in the length direction of the groove. Accordingly, a part of the groove of the gas flow path structure 133 and a part surrounded by the first anode 112 become the first gas discharge path 115, and the rest of the groove of the gas flow path structure 133 and a part surrounded by the second anode 122 become the second gas discharge path 125. The first gas discharge path 115 and the second gas discharge path 125 communicate with each other.

Further, a plurality of liquid flow path structures 135 are arranged in parallel between the first cathode 111 and the second cathode 121 and the first anode 112 and the second anode 122 so as to be parallel to the length direction of the grooves of the gas flow path structures 132 and 133. Accordingly, a part surrounded by a part of the first cathode 111, the first anode 112, and the liquid flow path structure 135 is the first liquid flow path 113, and a part surrounded by the rest of the second cathode 121, the second anode 122, and the liquid flow path structure 135 is the second liquid flow path 123. The first liquid flow path 113 and the second liquid flow path 123 communicate with each other.

In this manner, the electrochemical reaction device 100 is a single cell in which the first reaction unit 110 and the second reaction unit 120 are integrated. In the first reaction unit 110 of the electrochemical reaction device 100, the first liquid flow path 113 is formed between the first cathode 111 and the first anode 112, the first gas flow path 114 is formed between the first cathode 111 and the power supplying body 131, and the first gas discharge path 115 is formed between the first anode 112 and the power supplying body 134. Similarly, in the second reaction unit 120, the second liquid flow path 123 is formed between the second cathode 121 and the second anode 122, the second gas flow path 124 is formed between the second cathode 121 and the power supplying body 131, and the second gas discharge path 125 is formed between the second anode 122 and the power supplying body 134.

The power supplying body 131 and the power supplying body 134 are electrically connected to a power source (not illustrated). Further, the gas flow path structure 132 and the gas flow path structure 133 are conductors, and by supplying electric power from the power source to the power supplying body 131 and the power supplying body 134, voltages can be applied to a space between the first cathode 111 and the first anode 112 and a space between the second cathode 121 and the second anode 122, respectively.

The first cathode 111 and the second cathode 121 are electrodes that reduce carbon dioxide to generate carbon compounds and reduce water to generate hydrogen. The first cathode 111 and the second cathode 121 may be any electrode as long as the electrode can electrochemically reduce carbon dioxide and carbon dioxide gas or gaseous products generated by the reduction permeate therethrough. As the first cathode 111, for example, an electrode having a cathode catalyst layer formed on the first liquid flow path 113 side of the gas diffusion layer can be exemplified. As the second cathode 121, for example, an electrode having a cathode catalyst layer formed on the second liquid flow path 123 side of the gas diffusion layer can be exemplified. A part of the cathode catalyst layer may enter the gas diffusion layer. A porous layer that is denser than the gas diffusion layer may be disposed between the gas diffusion layer and the cathode catalyst layer.

As the cathode catalyst that forms the cathode catalyst layer, a known catalyst that reduces carbon dioxide to generate carbon compounds can be used. Specific examples of the cathode catalyst include metals such as gold, silver, copper, platinum, palladium, nickel, cobalt, iron, manganese, titanium, cadmium, zinc, indium, gallium, lead, and tin; alloys and intermetallic compounds of these metals; and metal complexes such as a ruthenium complex and a rhenium complex. As the cathode catalyst, a supported catalyst in which metal particles are supported on a carbon material (carbon particles, carbon nanotubes, graphene, and the like) may be used. As the cathode catalyst, one type may be used alone, or two or more types may be used in combination.

As the cathode catalyst used for the first cathode 111, copper is preferable because the reduction of carbon dioxide gas is promoted therewith.

As the cathode catalyst used for the second cathode 121, copper is preferable because the reduction of dissolved carbon dioxide in the electrolyte is promoted therewith.

The gas diffusion layer of the first cathode 111 and the second cathode 121 is not particularly limited, and examples thereof include carbon paper and carbon cloth.

The method of producing the first cathode 111 and the second cathode 121 is not particularly limited, and for example, a method of applying a liquid composition containing a cathode catalyst to a surface of a gas diffusion layer by sputtering or the like and drying the surface, or a method of depositing a metal serving as a cathode catalyst on the surface of a gas diffusion layer using an arc plasma gun can be exemplified.

The first anode 112 and the second anode 122 are electrodes for oxidizing hydroxide ions to generate oxygen. The first anode 112 and the second anode 122 may be any electrode as long as the electrode can electrochemically oxidize hydroxide ions and the generated oxygen can permeate therethrough. As the first anode 112, for example, an electrode having an anode catalyst layer formed on the first liquid flow path 113 side of the gas diffusion layer can be exemplified. As the second anode 122, for example, an electrode having an anode catalyst layer formed on the second liquid flow path 123 side of the gas diffusion layer can be exemplified. The first anode 112 and the second anode 122 may be one anode connected to each other.

The anode catalyst that forms the anode catalyst layer is not particularly limited, and a known anode catalyst can be used. Specifically, examples thereof include metals such as platinum, palladium, and nickel; alloys and intermetallic compounds of these metals; metal oxides such as manganese oxide, iridium oxide, nickel oxide, cobalt oxide, iron oxide, tin oxide, indium oxide, ruthenium oxide, lithium oxide, and lanthanum oxide; and metal complexes such as a ruthenium complex and a rhenium complex. As the anode catalyst, one type may be used alone, or two or more types may be used in combination.

Examples of the gas diffusion layer of the first anode 112 and the second anode 122 include carbon paper and carbon cloth. Further, as the gas diffusion layer, a porous body such as a mesh material, a punching material, a porous material, or a metal fiber sintered body may be used. Examples of the material of the porous body include metals such as titanium, nickel, and iron, and alloys (for example, SUS) of these metals.

Examples of the material of the liquid flow path structure 135 include a fluorocarbon resin such as polytetrafluoroethylene.

Examples of the materials of the gas flow path structures 132 and 133 include metals such as titanium and SUS; and carbon.

Examples of the material of the power supplying bodies 131 and 134 include metals such as copper, gold, titanium, and SUS; and carbon. For the power supplying bodies 131 and 134, those having a surface of a copper base material plated with gold or the like may be used.

The first liquid flow path closing means 116 includes a first liquid solenoid valve 141 and a second liquid solenoid valve 142 that open and close the inlet and outlet of the first liquid flow path 113 in an openable and closable manner. The second liquid flow path closing means 126 includes the second liquid solenoid valve 142 and a third liquid solenoid valve 143 that open and close the inlet and outlet of the second liquid flow path 123 in an openable and closable manner. The second liquid solenoid valve 142 is shared by the first liquid flow path closing means 116 and the second liquid flow path closing means 126.

More specifically, the first liquid solenoid valve 141 is provided at the inlet of the first liquid flow path 113. The second liquid solenoid valve 142 is provided at the boundary part between the first liquid flow path 113 and the second liquid flow path 123, that is, at the outlet of the first liquid flow path 113 and the inlet of the second liquid flow path 123. The third liquid solenoid valve 143 is provided at the outlet of the second liquid flow path 123. By closing the first liquid solenoid valve 141 and the second liquid solenoid valve 142, the inlet and outlet of the first liquid flow path 113 can be closed. In addition, by closing the second liquid solenoid valve 142 and the third liquid solenoid valve 143, the inlet and outlet of the second liquid flow path 123 can be closed.

The first gas flow path closing means 117 includes a first gas solenoid valve 144 and a second gas solenoid valve 145 that open and close the inlet and outlet of the first gas flow path 114 in an openable and closable manner. The second gas flow path closing means 127 includes the second gas solenoid valve 145 and a third gas solenoid valve 146 that open and close the inlet and outlet of the second gas flow path 124 in an openable and closable manner. The second gas solenoid valve 145 is shared by the first gas flow path closing means 117 and the second gas flow path closing means 127.

More specifically, the first gas solenoid valve 144 is provided at the inlet of the first gas flow path 114. The second gas solenoid valve 145 is provided at the boundary part between the first gas flow path 114 and the second gas flow path 124, that is, at the outlet of the first gas flow path 114 and the inlet of the second gas flow path 124. The third gas solenoid valve 146 is provided at the outlet of the second gas flow path 124. By closing the first gas solenoid valve 144 and the second gas solenoid valve 145, the inlet and outlet of the first gas flow path 114 can be closed. Further, by closing the second gas solenoid valve 145 and the third gas solenoid valve 146, the inlet and outlet of the second gas flow path 124 can be closed.

A fourth gas solenoid valve 147 is provided at the inlet of the first gas discharge path 115.

The first gas flow path 114 is provided with a pressure sensor 151 for monitoring the pressure in the first gas flow path 114 and a carbon dioxide sensor 152 for monitoring the carbon dioxide concentration. The second gas flow path 124 is provided with an ethylene sensor 153 for monitoring the ethylene concentration in the second gas flow path 124.

Figure 2:
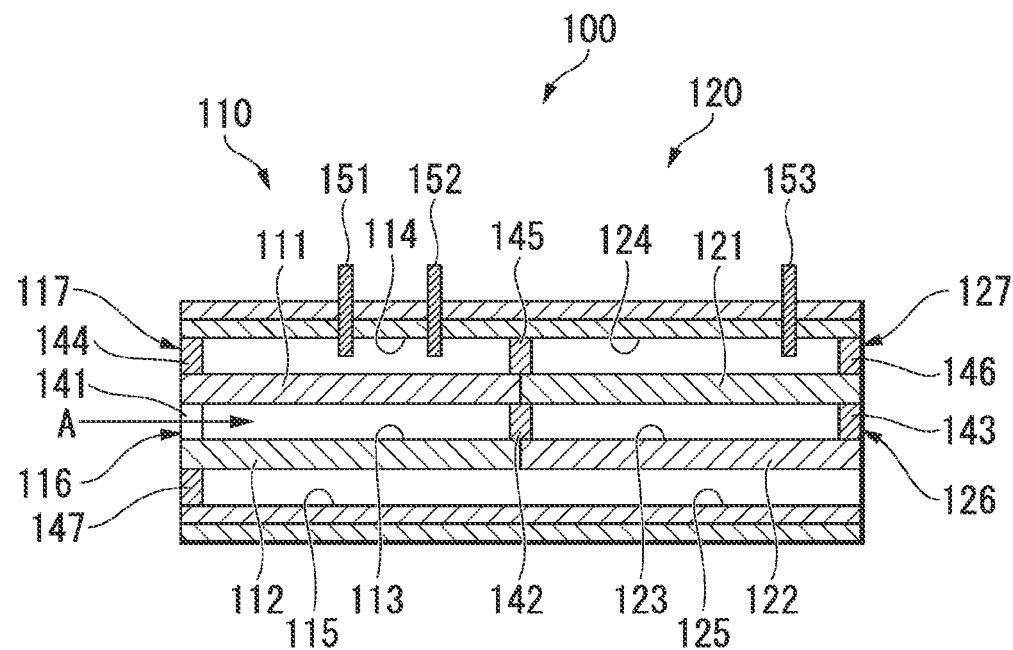
FIG. 2 is a sectional view describing a procedure of carbon dioxide reduction of the electrochemical reaction device of FIG. 1.
Figure 3:
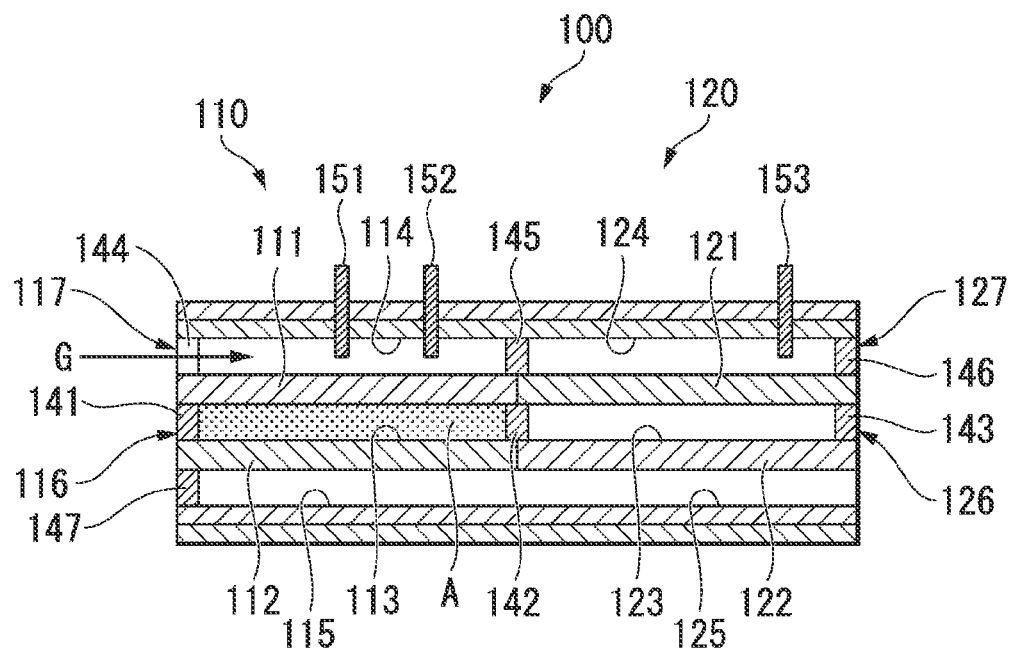
FIG. 3 is a sectional view describing a procedure of carbon dioxide reduction of the electrochemical reaction device of FIG. 1.
Figure 4:
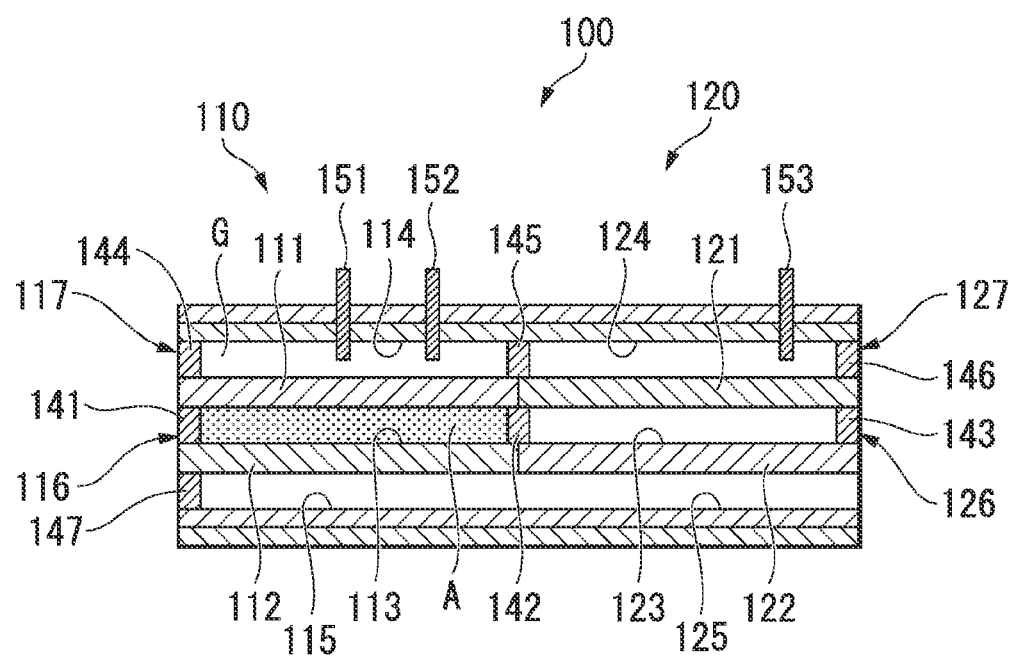
FIG. 4 is a sectional view describing a procedure of carbon dioxide reduction of the electrochemical reaction device of FIG. 1.

In the electrochemical reaction device 100, as illustrated in FIG. 2, in a state where the second liquid solenoid valve 142 is closed and the first liquid solenoid valve 141 is open, an electrolyte A composed of a strong alkaline aqueous solution can be supplied to the first liquid flow path 113. Then, as illustrated in FIG. 3, by closing the first liquid solenoid valve 141, the inlet and outlet of the first liquid flow path 113 can be closed in a state where the electrolyte A is accommodated. Further, as illustrated in FIG. 3, carbon dioxide gas G can be supplied to the first gas flow path 114 in a state where the second gas solenoid valve 145 is closed and the first gas solenoid valve 144 is open. Then, as illustrated in FIG. 4, by closing the first gas solenoid valve 144, the inlet and outlet of the first gas flow path 114 can be closed in a state where the carbon dioxide gas G is accommodated.

Further, by opening the second liquid solenoid valve 142 in a state where the third liquid solenoid valve 143 is closed, an electrolyte B after the reaction in the first reaction unit 110 can be moved from the first liquid flow path 113 to the second liquid flow path 123. The method of moving the electrolyte B from the first liquid flow path 113 to the second liquid flow path 123 is not particularly limited, and for example, a method of inclining the entire electrochemical reaction device 100 such that the second liquid flow path 123 is lower than the first liquid flow path 113 can be exemplified.

[Method of Reducing Carbon Dioxide]

The method of reducing carbon dioxide according to an aspect of the present invention is a method of electrochemically reducing carbon dioxide, and includes the following steps (a) and (b).

Step (a): In a state where an electrolyte composed of a strong alkaline aqueous solution is accommodated in a first liquid flow path in which the inlet and outlet between the first cathode and the first anode are closed, and carbon dioxide gas is accommodated in the first gas flow path in which the inlet and outlet on a side of the first cathode opposite to the first anode are closed, the carbon dioxide gas is electrochemically reduced, and the unreacted carbon dioxide gas dissolves in the electrolyte.

Step (b): The electrolyte in which carbon dioxide dissolves is moved from the first liquid flow path to the second liquid flow path between the second cathode and the second anode, and the dissolved carbon dioxide in the electrolyte is electrochemically reduced in the second liquid flow path.

The method of reducing carbon dioxide of the present invention can be used as a method of producing carbon compounds. In other words, by using the method of reducing carbon dioxide of the present invention, carbon compounds obtained by reducing carbon dioxide or carbon compounds obtained by synthesizing by using carbon compounds obtained by reducing carbon dioxide as a raw material can be produced. For example, ethylene can be produced by using the method of reducing carbon dioxide of the present invention.

Hereinafter, the method of reducing carbon dioxide will be described by taking a case of using the above-described electrochemical reaction device 100 as an example.

(Step (a))

For example, as illustrated in FIG. 1, the first liquid solenoid valve 141, the second liquid solenoid valve 142, the third liquid solenoid valve 143, the first gas solenoid valve 144, the second gas solenoid valve 145, and the third gas solenoid valve 146 in the electrochemical reaction device 100 are all in a closed state. As illustrated in FIG. 2, the first liquid solenoid valve 141 is open, and the electrolyte A composed of a strong alkaline aqueous solution is supplied to the first liquid flow path 113. Then, as illustrated in FIG. 3, the first liquid solenoid valve 141 is closed, and the inlet and outlet of the first liquid flow path 113 is closed in a state where the electrolyte A is accommodated.

Further, as illustrated in FIG. 3, the first gas solenoid valve 144 is open, and while monitoring the pressure and the carbon dioxide concentration in the first gas flow path 114 by the pressure sensor 151 and the carbon dioxide sensor 152, the carbon dioxide gas G is supplied to the first gas flow path 114. Then, when the carbon dioxide concentration in the first gas flow path 114 reaches a predetermined value, a voltage is applied between the first cathode 111 and the first anode 112. Further, when the pressure in the first gas flow path 114 reaches a predetermined value (for example, 80% of the supply pressure), the first gas solenoid valve 144 is closed, and as illustrated in FIG. 4, the inlet and outlet of the first gas flow path 114 in a state where the carbon dioxide gas G is accommodated are closed.

In this state, while the voltage application to the first cathode 111 and the first anode 112 is continued and the voltage is adjusted according to the decrease in the carbon dioxide concentration in the first gas flow path 114, the carbon dioxide gas G is electrochemically reduced at the first cathode 111 of the first reaction unit 110. When carbon dioxide is reduced at the first cathode 111, carbon monoxide and ethylene are mainly generated as carbon compounds by the following reaction. Hydrogen is also generated at the first cathode 111 by the following reaction. These gaseous products permeate the gas diffusion layer of the first cathode 111 to the first gas flow path 114 side.

$$CO_2 + H_2O \rightarrow CO + 2OH^-$$

$$2CO + 8H_2O \rightarrow C_2H_4 + 8OH^- + 2H_2O$$

$$2H_2O \rightarrow H_2 + 2OH^-$$

Further, the hydroxide ions generated at the first cathode 111 moves in the electrolyte A to the first anode 112 and are oxidized by the following reaction to generate oxygen. By closing the fourth gas solenoid valve 147 and keeping the first gas discharge path 115 at a negative pressure, the generated oxygen quickly permeates the gas diffusion layer of the first anode 112, and is discharged through the first gas discharge path 115 and the second gas discharge path 125.

$$4OH^- \rightarrow O_2 + 2H_2O$$

Carbon dioxide has a property of more easily dissolving in an alkaline aqueous solution than gaseous products generated by reduction of ethylene, hydrogen and the like. Therefore, the inlet and outlet of the first liquid flow path 113 in which the electrolyte A is accommodated and the inlet and outlet of the first gas flow path 114 in which the carbon dioxide gas G is accommodated are closed, and accordingly, the unreacted carbon dioxide gas G selectively dissolves in the electrolyte A, and gaseous products C containing ethylene remains in the first gas flow path 114. As a result, the gaseous products C in the first gas flow path 114 after the reaction are a gas having a low carbon dioxide concentration and a high ethylene concentration.

Examples of the strong alkaline aqueous solution used for the electrolyte A include a potassium hydroxide aqueous solution and a sodium hydroxide aqueous solution. Of these, a potassium hydroxide aqueous solution is preferable because carbon dioxide has excellent solubility and the reduction of carbon dioxide is promoted therewith.

(Step (b))

Figure 5:
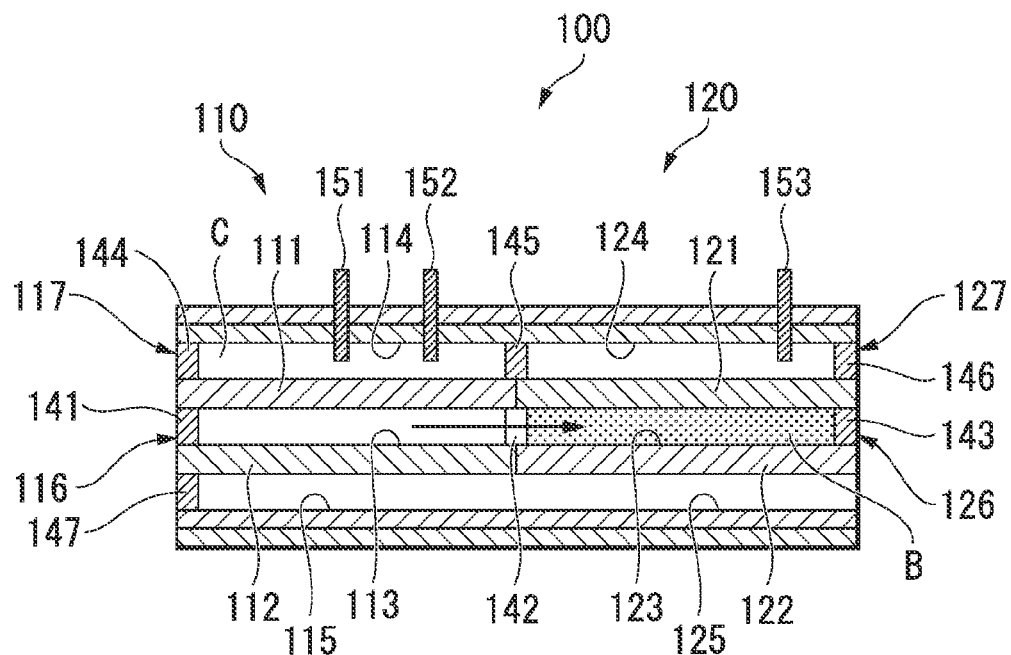
FIG. 5 is a sectional view describing a procedure of carbon dioxide reduction of the electrochemical reaction device of FIG. 1.

The electrolyte B in which unreacted carbon dioxide dissolves is in a weak alkaline state. For example, after the carbon dioxide concentration in the first gas flow path 114 reaches the minimum value, as illustrated in FIG. 5, the second liquid solenoid valve 142 is opened, and the electrolyte B is moved from the first liquid flow path 113 to the second liquid flow path 123. Then, a voltage is applied between the second cathode 121 and the second anode 122, and the dissolved carbon dioxide in the electrolyte B is electrochemically reduced in the second reaction unit 120 while appropriately adjusting the voltage.

When carbon dioxide is reduced at the second cathode 121, carbon monoxide, ethylene, hydrogen and the like are generated similar to the reduction at the first cathode 111. These gaseous products permeate the gas diffusion layer of the second cathode 121 to the second gas flow path 124 side. When the dissolved carbon dioxide in the electrolyte B is sufficiently reduced, the electrolyte returns to a strong alkaline state (electrolyte A). Further, at the second anode 122, hydroxide ions are oxidized to generate oxygen. By keeping the second gas discharge path 125 at a negative pressure, the generated oxygen quickly permeates the gas diffusion layer of the second anode 122 and is discharged through the second gas discharge path 125.

Figure 6:
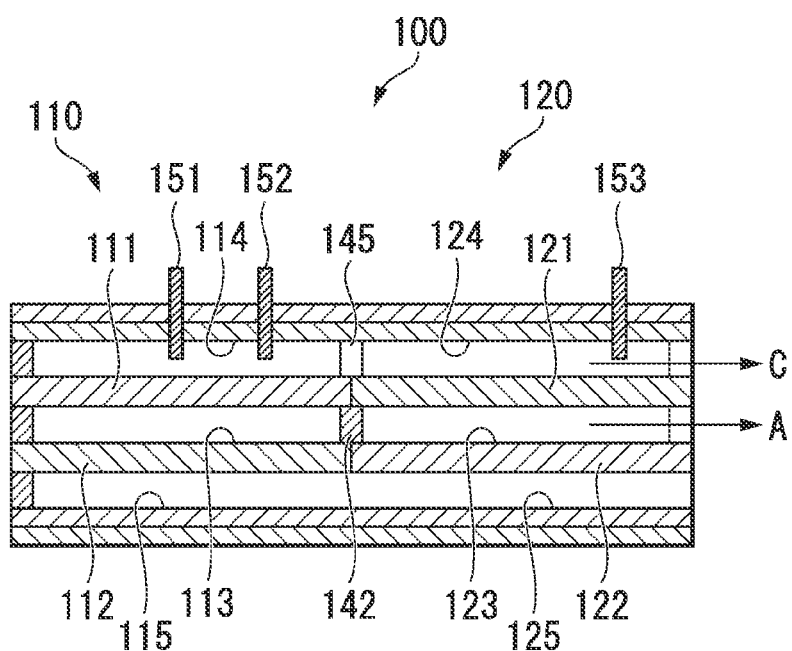
FIG. 6 is a sectional view describing a procedure of carbon dioxide reduction of the electrochemical reaction device of FIG. 1.

In the reaction of the second reaction unit 120, the reduced carbon dioxide dissolves in the electrolyte B, and thus the inflow into the second gas flow path 124 is suppressed. Therefore, the gaseous products C in the second gas flow path 124 after the reaction are also a gas having a low carbon dioxide concentration and a high ethylene concentration. The ethylene concentration in the second gas flow path 124 is monitored by the ethylene sensor 153, and after the ethylene concentration reaches a certain value, as illustrated in FIG. 6, the third liquid solenoid valve 143, the second gas solenoid valve 145, and the third gas solenoid valve 146 are opened, and the gaseous products C of the first gas flow path 114 and the second gas flow path 124 and the electrolyte A of the second liquid flow path 123 are discharged.

The voltage applied between the first cathode 111 and the first anode 112 during the reduction of carbon dioxide gas in the step (a) and the voltage applied between the second cathode 121 and the second anode 122 during the reduction of the dissolved carbon dioxide in the step (b) each can be adjusted as appropriate. The electrochemical reduction of carbon dioxide is more likely to proceed in a strong alkaline electrolyte having a large amount of hydroxide ions than in a weak alkaline electrolyte. Therefore, the reduction of carbon dioxide is more likely to proceed in the step (a) using the strong alkaline electrolyte A than in the step (b) using the weak alkaline electrolyte B, and the applied voltage can be lowered. From this, by setting the average value of the voltages applied between the first cathode 111 and the first anode 112 in the step (a) to be lower than the average value of the voltages applied between the second cathode 121 and the second anode 122 in the step (b), carbon dioxide can be sufficiently reduced while improving the energy efficiency. In addition, either the average value of the voltages applied between the first cathode 111 and the first anode 112 in the step (a) or the average value of the voltages applied between the second cathode 121 and the second anode 122 in the step (b) may be higher.

As described above, in the electrochemical reaction device and the method of reducing carbon dioxide of the embodiment, the electrolyte A is accommodated in the first liquid flow path 113 in which the inlet and outlet are closed, and in a state where the carbon dioxide gas G is accommodated in the first gas flow path 114 in which the inlet and outlet are closed, the carbon dioxide gas G is electrochemically reduced. Therefore, the unreacted carbon dioxide gas G dissolves in the electrolyte A and does not easily remain in the first gas flow path 114, and thus the purity of the carbon compounds obtained by the reduction is high. Further, since the electrolyte B in which carbon dioxide dissolved is moved to the second liquid flow path 123 and is electrochemically reduced as the dissolved carbon dioxide, carbon dioxide gas is less likely to be mixed in at this time as well, and the purity of the carbon compounds obtained by the reduction increases. From these things, it is possible to obtain valuable resources from carbon dioxide at low cost and high energy efficiency.

The present invention is not limited to the above-described electrochemical reaction device 100 and the method of reducing carbon dioxide using the same. For example, in the electrochemical reaction device 100, the first reaction unit 110 and the second reaction unit 120 are connected to each other to form one cell, but the electrochemical reaction device 100 may be an electrochemical reaction device in which the second reaction unit is provided on the downstream side of the first reaction unit as a cell separate from the first reaction unit.

[Carbon Dioxide Treatment Apparatus]

Figure 7:
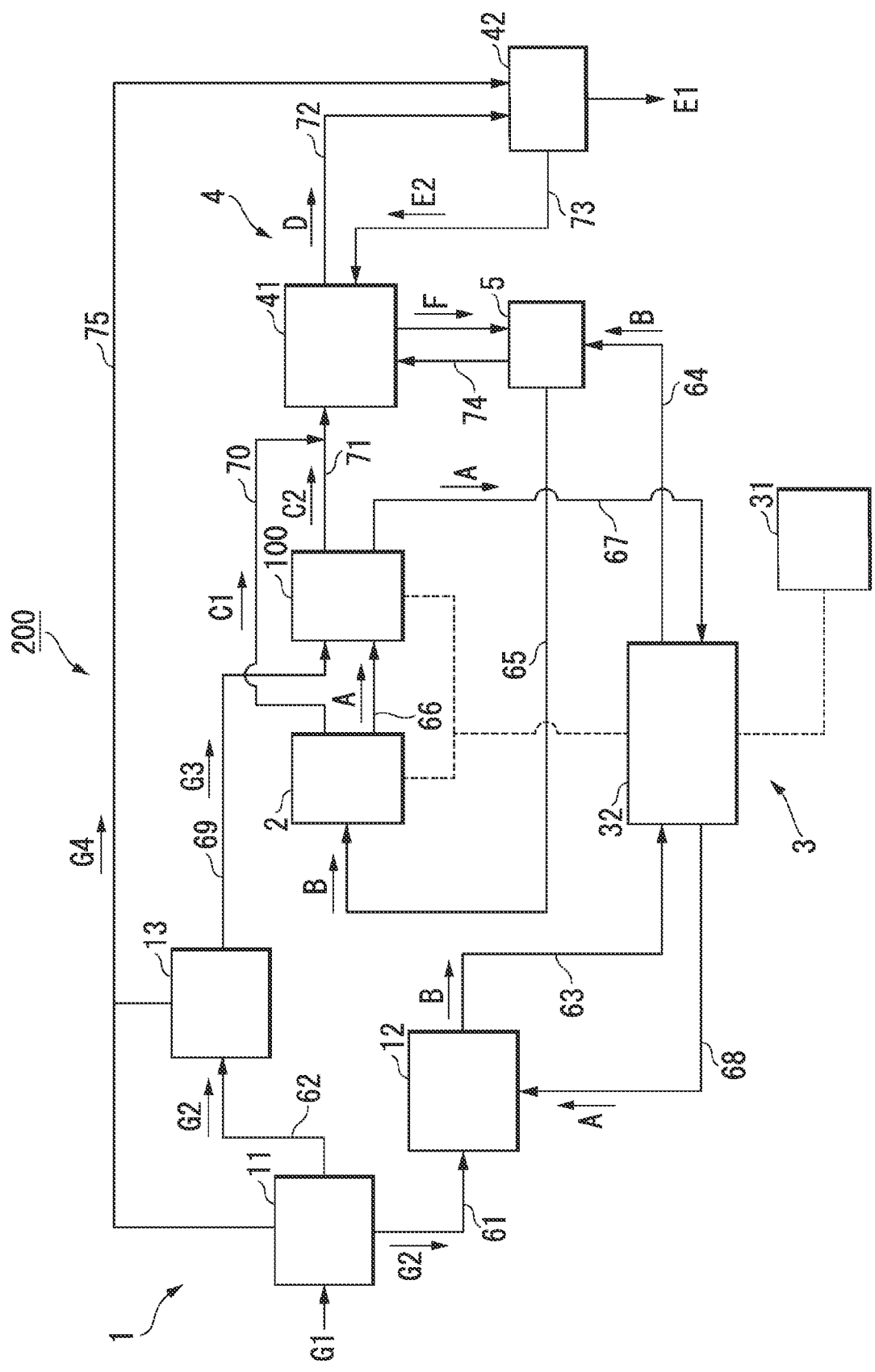
FIG. 7 is a block diagram illustrating an example of a carbon dioxide treatment apparatus including the electrochemical reaction device according to the embodiment.

Hereinafter, an example of using the electrochemical reaction device of the embodiment will be described. The electrochemical reaction device 100 of the embodiment can be used, for example, in a carbon dioxide treatment apparatus 200 illustrated in FIG. 7.

The carbon dioxide treatment apparatus 200 includes a capturing device 1, an electrochemical reaction device (first electrochemical reaction device) 2, the electrochemical reaction device (second electrochemical reaction device) 100, a power storage device 3, a homologation reaction device 4, and a heat exchanger 5. The capturing device 1 includes a concentration unit 11, an absorption unit 12, and a concentration unit 13. The power storage device 3 includes a conversion unit 31 and a storage unit 32 electrically connected to the conversion unit 31. The homologation reaction device 4 includes a reactor 41 and a gas-liquid separator 42.

In the carbon dioxide treatment apparatus 200, the concentration unit 11 and the absorption unit 12 are connected by a gas flow path 61. The concentration unit 11 and the concentration unit 13 are connected by a gas flow path 62. The absorption unit 12 and the storage unit 32 are connected by a liquid flow path 63 and a liquid flow path 68. The storage unit 32 and the heat exchanger 5 are connected by a liquid flow path 64. The heat exchanger 5 and the electrochemical reaction device 2 are connected by a liquid flow path 65. The electrochemical reaction device 2 and the electrochemical reaction device 100 are connected by a liquid flow path 66. The electrochemical reaction device 100 and the storage unit 32 are connected by a liquid flow path 67. The electrochemical reaction device 2 and the reactor 41 are connected by a gas flow path 70. The electrochemical reaction device 100 and the reactor 41 are connected by a gas flow path 71. The reactor 41 and the gas-liquid separator 42 are connected by a gas flow path 71, a gas flow path 72, and a gas flow path 73. A circulation flow path 74 of heat medium is provided between the reactor 41 and the heat exchanger 5. The concentration units 11 and 13 and the gas-liquid separator 42 are connected by a gas flow path 75.

Each of these flow paths is not particularly limited, and known piping or the like can be appropriately used therefor. Air feeding means such as a compressor, a pressure reducing valve, measuring equipment such as a pressure gauge, and the like can be appropriately installed in the gas flow paths 61, 62, 70 to 73, and 75. Further, liquid feeding means such as a pump, measuring equipment such as a flowmeter, and the like can be appropriately installed in the liquid flow paths 63 to 68.

The capturing device 1 is a device that captures carbon dioxide. Gas G1 containing carbon dioxide such as the atmosphere and exhaust gas is supplied to the concentration unit 11. In the concentration unit 11, carbon dioxide of the gas G1 is concentrated. As the concentration unit 11, a known concentrating device can be adopted as long as the device can concentrate carbon dioxide. For example, a membrane separation device utilizing the difference in permeation speed with respect to the membrane, or an adsorption/separation device utilizing chemical or physical adsorption or desorption, can be used. Among these, a membrane separation device is preferable as the concentration unit 11 from the viewpoint of the energy efficiency.

A part of the concentrated gas G2 obtained by concentrating carbon dioxide in the concentration unit 11 is fed to the absorption unit 12 through the gas flow path 61, and the rest is fed to the concentration unit 13 through the gas flow path 62. In the concentration unit 13, carbon dioxide of the concentrated gas G2 supplied from the concentration unit 11 is further concentrated. The concentration unit 13 is not particularly limited, and the same as those exemplified in the concentration unit 11 can be exemplified, and a membrane separation device is preferable. The concentrated gas G3 obtained by further concentrating carbon dioxide in the concentration unit 13 is supplied to the first gas flow path 114 of the first reaction unit 110 of the electrochemical reaction device 100 through the gas flow path 69. Separated gas G4 separated from the concentrated gas G2 and G3 in the concentration units and 11 and 13 is fed to the gas-liquid separator 42 through the gas flow path 75.

In the absorption unit 12, the carbon dioxide gas in the concentrated gas G2 supplied from the concentration unit 11 comes into contact with the electrolyte A, and the carbon dioxide dissolves and is absorbed in the electrolyte A. The method of bringing the carbon dioxide gas and the electrolyte A into contact with each other is not particularly limited, and examples thereof include a method of blowing the concentrated gas G2 into the electrolyte A and bubbling.

In the absorption unit 12, the electrolyte A composed of a strong alkaline aqueous solution is used as an absorption solution for absorbing carbon dioxide. As described above, since carbon dioxide easily dissolves in a strong alkaline aqueous solution, the carbon dioxide in the concentrated gas G2 is selectively absorbed in the electrolyte A in the absorption unit 12. In this manner, the concentration of carbon dioxide can be assisted by using the electrolyte A in the absorption unit 12. Therefore, it is not necessary to concentrate carbon dioxide to a high concentration in the concentration unit 11, and the energy required for concentration in the concentration unit 11 can be reduced.

The electrolyte B in which carbon dioxide has been absorbed in the absorption unit 12 is fed to the electrochemical reaction device 2 through the liquid flow path 63, the storage unit 32, the liquid flow path 64, the heat exchanger 5, and the liquid flow path 65. Further, the electrolyte A flowing out of the electrochemical reaction device 2 is fed to the electrochemical reaction device 100 through the liquid flow path 66. Furthermore, the electrolyte A flowing out of the electrochemical reaction device 100 is fed to the absorption unit 12 through the liquid flow path 67, the storage unit 32, and the liquid flow path 68. In this manner, in the carbon dioxide treatment apparatus 200, the electrolyte is circulated and shared between the absorption unit 12, the storage unit 32, the electrochemical reaction device 2, and the electrochemical reaction device 100.

Examples of the strong alkaline aqueous solution used for the electrolyte A include a potassium hydroxide aqueous solution and a sodium hydroxide aqueous solution. Among these, a potassium hydroxide aqueous solution is preferable from the viewpoint that carbon dioxide has excellent solubility in the absorption unit 12 and the reduction of carbon dioxide in the electrochemical reaction device 2 is promoted.

Figure 8:
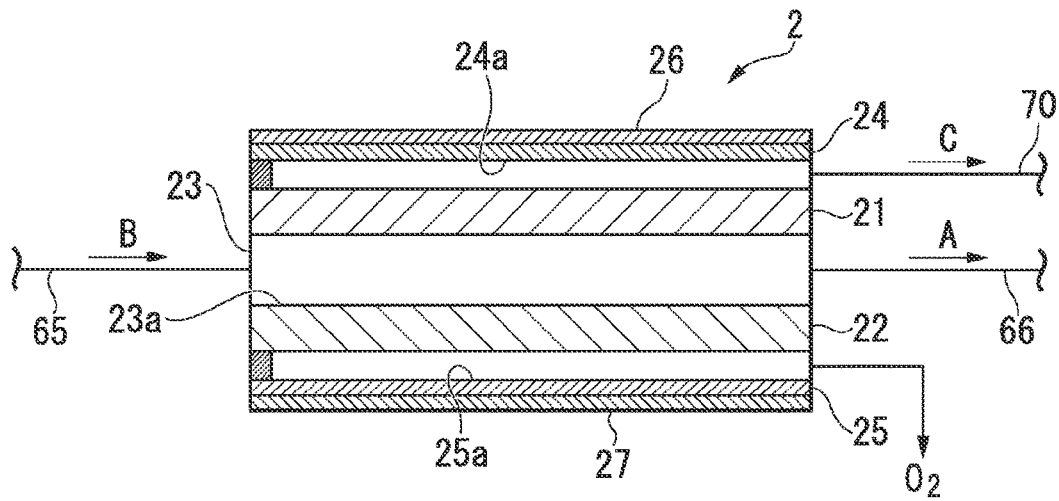
FIG. 8 is a sectional view illustrating a first electrochemical reaction device of the carbon dioxide treatment apparatus of FIG. 7.

The electrochemical reaction device 2 is a device that electrochemically reduces carbon dioxide. As illustrated in FIG. 8, the electrochemical reaction device 2 includes the cathode 21, the anode 22, a liquid flow path structure 23 for forming the liquid flow path 23a, a gas flow path structure 24 in which a gas flow path 24a is formed, a gas flow path structure 25 in which a gas flow path 25a is formed, a power supplying body 26, and a power supplying body 27.

In the electrochemical reaction device 2, the power supplying body 26, the gas flow path structure 24, the cathode 21, the liquid flow path structure 23, the anode 22, the gas flow path structure 25, and the power supplying body 27 are laminated in this order. A slit is formed in the liquid flow path structure 23, and the region surrounded by the cathode 21, the anode 22, and the liquid flow path structure 23 in the slit is the liquid flow path 23a. A groove is formed on the cathode 21 side of the gas flow path structure 24, and a part of the groove surrounded by the gas flow path structure 24 and the cathode 21 is the gas flow path 24a. A groove is formed on the anode 22 side of the gas flow path structure 25, and a part of the groove surrounded by the gas flow path structure 25 and the anode 22 is the gas flow path 25a.

In this manner, in the electrochemical reaction device 2, the liquid flow path 23a is formed between the cathode 21 and the anode 22, the gas flow path 24a is formed between the cathode 21 and the power supplying body 26, and the gas flow path 25a is formed between the anode 22 and the power supplying body 27. The power supplying body 26 and the power supplying body 27 are electrically connected to the storage unit 32 of the power storage device 3. Further, the gas flow path structure 24 and the gas flow path structure 25 are conductors, and a voltage can be applied between the cathode 21 and the anode 22 by the electric power supplied from the storage unit 32.

As the cathode 21 and the anode 22, for example, the same ones as the second cathode 121 and the second anode 122, which are exemplified in the electrochemical reaction device 100, can be exemplified. As the liquid flow path structure 23, the gas flow path structures 24 and 25, and the power supplying bodies 26 and 27, the same ones as the liquid flow path structure 135, the gas flow path structures 132 and 133, and the power supplying bodies 131 and 134, which were provided as exemplary examples of the electrochemical reaction device 100, are exemplary examples.

The electrochemical reaction device 2 is a flow cell in which the electrolyte B supplied from the absorption unit 12 flows through the liquid flow path 23a. Then, when a voltage is applied to the cathode 21 and the anode 22, the dissolved carbon dioxide in the electrolyte B flowing through the liquid flow path 23a is electrochemically reduced at the cathode 21 to generate carbon compounds and hydrogen. Since carbon dioxide dissolves in the electrolyte B at the inlet of the liquid flow path 23a, the electrolyte B is in a weak alkaline state where the abundance ratio of $CO_3^{2-}$ is high. Meanwhile, as the reduction proceeds, the amount of dissolved carbon dioxide decreases, and the electrolyte A in a strong alkaline state is obtained at the outlet of the liquid flow path 23a.

In this manner, in the carbon dioxide treatment apparatus 200, the electrolyte used for the electrochemical reaction device 2 is shared as the absorption solution of the absorption unit 12, and carbon dioxide is supplied to the electrochemical reaction device 2 while dissolving in the electrolyte B and is electrochemically reduced. Accordingly, for example, compared to a case where carbon dioxide is adsorbed to an adsorbent and desorbed by heating for reduction, the energy required for desorption of carbon dioxide is reduced, the energy efficiency can be improved, and carbon dioxide loss can be also reduced.

In the carbon dioxide treatment apparatus 200, the liquid flow path 23a of the electrochemical reaction device 2 and the first liquid flow path 113 of the electrochemical reaction device 100 are connected by the liquid flow path 66. Further, the liquid flow path 67 is connected to the second liquid flow path 123 of the electrochemical reaction device 100. Therefore, the electrolyte A flowing out of the liquid flow path 23a of the electrochemical reaction device 2 is supplied to the first liquid flow path 113 of the first reaction unit 110 in the electrochemical reaction device 100 through the liquid flow path 66. Then, the electrolyte A after the reaction between the first reaction unit 110 and the second reaction unit 120 flows out of the second liquid flow path 123 of the second reaction unit 120 to the liquid flow path 67.

The power storage device 3 is a device that supplies electric power to the electrochemical reaction device 2 and the electrochemical reaction device 100.

In the conversion unit 31, renewable energy is converted into electric energy. The conversion unit 31 is not particularly limited, and examples thereof include a wind power generator, a solar power generator, and a geothermal power generator. The number of conversion units 31 included in the power storage device 3 may be one, or may be two or more.

The electric energy converted by the conversion unit 31 is stored in the storage unit 32. By storing the converted electric energy in the storage unit 32, it is possible to stably supply electric power to the electrochemical reaction device 2 even during a time period when the conversion unit is not generating power. Further, in a case where renewable energy is used, voltage fluctuations tend to be large in general, but once stored in the storage unit 32, the electric power can be supplied to the electrochemical reaction device 2 at a stable voltage.

The storage unit 32 in this example is a nickel-hydride battery. In addition, the storage unit 32 may be any battery as long as the battery can be charged and discharged, and may be, for example, a lithium-ion secondary battery or the like.

Figure 9:
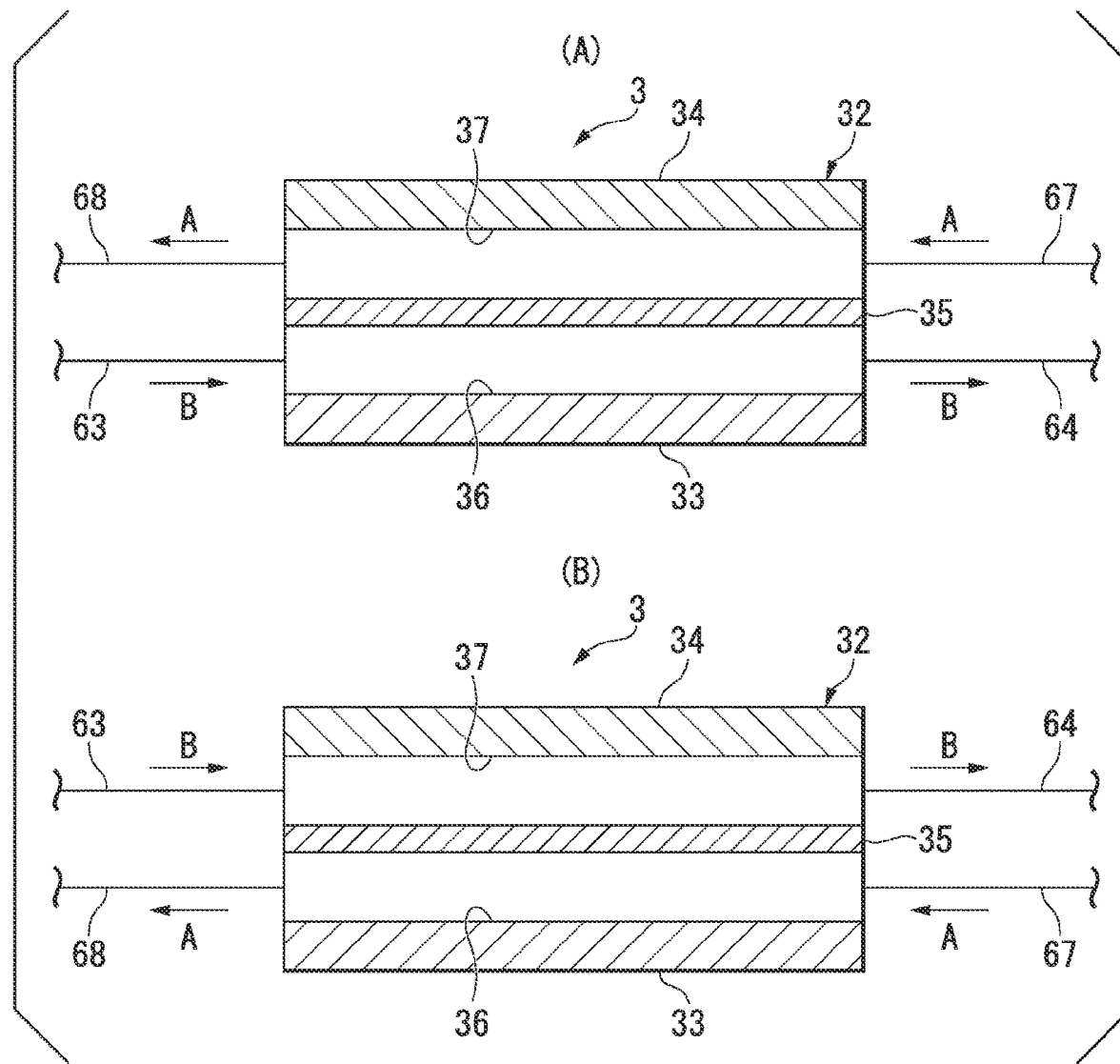
FIG. 9 is a sectional view illustrating a nickel-hydride battery which is an example of a storage unit of the carbon dioxide treatment apparatus of FIG. 7.

As illustrated in FIG. 9(A), the storage unit 32 is a nickel-hydride battery including a positive electrode 33, a negative electrode 34, a separator 35 provided between the positive electrode 33 and the negative electrode 34, a positive electrode side flow path 36 formed between the positive electrode 33 and the separator 35, and a negative electrode side flow path 37 formed between the negative electrode 34 and the separator 35. The positive electrode side flow path 36 and the negative electrode side flow path 37 can be formed by using, for example, a liquid flow path structure similar to the liquid flow path structure 135 of the electrochemical reaction device 100.

Examples of the positive electrode 33 include an electrode coated with a positive electrode active material on the positive electrode side flow path 36 side of a positive electrode current collector.

The positive electrode current collector is not particularly limited, and examples thereof include nickel foil and nickel-plated metal foil.

The positive electrode active material is not particularly limited, and examples thereof include nickel hydroxide and nickel oxyhydroxide.

Examples of the negative electrode 34 include an electrode coated with a negative electrode active material on the negative electrode side flow path 37 side of the negative electrode current collector.

The negative electrode current collector is not particularly limited, and examples thereof include a nickel mesh.

The negative electrode active material is not particularly limited, and examples thereof include known hydrogen occlusion alloys.

The separator 35 is not particularly limited, and examples thereof include an ion exchange membrane.

The nickel-hydride battery of the storage unit 32 is a flow cell in which the electrolyte flows through each of the positive electrode side flow path 36 on the positive electrode 33 side of the separator 35 and the negative electrode side flow path 37 on the negative electrode 34 side of the separator 35. In the carbon dioxide treatment apparatus 200, the electrolyte B supplied from the absorption unit 12 through the liquid flow path 63 and the electrolyte A supplied from the electrochemical reaction device 100 through the liquid flow path 67 flow through each of the positive electrode side flow path 36 and the negative electrode side flow path 37. Further, the connection of the liquid flow paths 63 and 64 to the storage unit 32 can be switched between a state of being connected to the positive electrode side flow path 36 and a state of being connected to the negative electrode side flow path 37, respectively. Similarly, the connection of the liquid flow paths 67 and 68 to the storage unit 32 can be switched between a state of being connected to the positive electrode side flow path 36 and a state of being connected to the negative electrode side flow path 37, respectively.

When the nickel-hydride battery is discharged, hydroxide ions are generated from water molecules at the positive electrode, and the hydroxide ions that have moved to the negative electrode receive hydrogen ions from the hydrogen occlusion alloy to generate water molecules. Therefore, from the viewpoint of discharge efficiency, it is advantageous that the electrolyte flowing through the positive electrode side flow path 36 is in a weak alkaline state, and it is advantageous that the electrolyte flowing through the negative electrode side flow path 37 is in a strong alkaline state. Therefore, at the time of discharge, as illustrated in FIG. 9(A), it is preferable that the liquid flow paths 63 and 64 be connected to the positive electrode side flow path 36, the liquid flow paths 67 and 68 be connected to the negative electrode side flow path 37, the electrolyte B (weak alkali) supplied from the absorption unit 12 flow through the positive electrode side flow path 36, and the electrolyte A (strong alkali) supplied from the electrochemical reaction device 100 flow through the negative electrode side flow path 37. In other words, at the time of discharge, it is preferable that the electrolyte be circulated in the order of the absorption unit 12, the positive electrode side flow path 36 of the storage unit 32, the electrochemical reaction device 2, the electrochemical reaction device 100, the negative electrode side flow path 37 of the storage unit 32, and the absorption unit 12.

Further, when a nickel-hydride battery is charged, water molecules are generated from hydroxide ions at the positive electrode, water molecules are decomposed into hydrogen atoms and hydroxide ions at the negative electrode, and hydrogen atoms are stored in a hydrogen occlusion alloy. Therefore, from the viewpoint of charge efficiency, it is advantageous that the electrolyte flowing through the positive electrode side flow path 36 is in a strong alkaline state, and it is advantageous that the electrolyte flowing through the negative electrode side flow path 37 is in a weak alkaline state. Therefore, at the time of charging, as illustrated in FIG. 9(B), it is preferable that the liquid flow paths 63 and 64 be connected to the negative electrode side flow path 37, the liquid flow paths 67 and 68 be connected to the positive electrode side flow path 36, the electrolyte B (weak alkali) supplied from the absorption unit 12 flow through the negative electrode side flow path 37, and the electrolyte A (strong alkali) supplied from the electrochemical reaction device 100 flow through the positive electrode side flow path 36. In other words, at the time of charging, it is preferable that the electrolyte be circulated in the order of the absorption unit 12, the negative electrode side flow path 37 of the storage unit 32, the electrochemical reaction device 2, the electrochemical reaction device 100, the positive electrode side flow path 36 of the storage unit 32, and the absorption unit 12.

In general, when a secondary battery is incorporated in an apparatus, the overall energy efficiency tends to decrease as much as the amount of charge/discharge efficiency. However, as described above, by using the pH gradients of the electrolyte A and the electrolyte B before and after the electrochemical reaction device 2 and the electrochemical reaction device 100, and by suitably exchanging the electrolytes flowing through the positive electrode side flow path 36 and the negative electrode side flow path 37 of the storage unit 32, it is possible to improve the charge/discharge efficiency of the "concentration overvoltage" of the electrode reaction represented by the Nernst equation.

The homologation reaction device 4 is a device for increasing the number of carbons by multimerizing ethylene generated by reducing carbon dioxide in the electrochemical reaction device 2 and the electrochemical reaction device 100.

The gaseous products C containing ethylene gas generated by the reduction in the electrochemical reaction device 2 and the electrochemical reaction device 100 is fed to the reactor 41 through the gas flow paths 70 and 71. In the reactor 41, the multimerization reaction of ethylene is carried out in the presence of the olefin multimerization catalyst. Accordingly, for example, it is possible to produce olefins having an extended carbon chain such as 1-butene, 1-hexene, and 1-octene.

The olefin multimerization catalyst is not particularly limited, and a known catalyst used for the multimerization reaction can be used. Examples thereof include a solid acid catalyst using zeolite and a transition metal complex compound.

In the homologation reaction device 4 of this example, generated gas D after the multimerization reaction flowing out of the reactor 41 is fed to the gas-liquid separator 42 through the gas flow path 72. An olefin having 6 or more carbon atoms is a liquid at room temperature. Therefore, for example, when an olefin having 6 or more carbon atoms is used as a target carbon compound, the temperature of the gas-liquid separator 42 is set to approximately 30° C. to make it possible to easily gas-liquid separate an olefin having 6 or more carbon atoms (olefin liquid E1) and an olefin having less than 6 carbon atoms (olefin gas E2). Further, by raising the temperature of the gas-liquid separator 42, the number of carbon atoms of the obtained olefin liquid E1 can be increased.

When the gas G1 supplied to the concentration unit 11 of the capturing device 1 is the atmosphere, the separated gas G4 fed from the concentration units 11 and 13 through the gas flow path 75 may be used for cooling the generated gas D in the gas-liquid separator 42. For example, using the gas-liquid separator 42 equipped with a cooling pipe, the separated gas G4 is passed through the cooling pipe, the generated gas D is passed to the outside of the cooling pipe, and the gas is aggregated on the surface of the cooling pipe to obtain the olefin liquid E1. Further, since the olefin gas E2 separated by the gas-liquid separator 42 contains unreacted components such as ethylene and an olefin having a smaller number of carbon atoms than that of the target olefin, the olefin gas E2 returns to the reactor 41 through the gas flow path 70, and can be reused for the multimerization reaction.

The multimerization reaction of ethylene in the reactor 41 is an exothermic reaction in which the feeder has a higher enthalpy than that of the product and the reaction enthalpy is negative. In the carbon dioxide treatment apparatus 200, a heat medium F is heated by using the reaction heat generated in the reactor 41 of the homologation reaction device 4, and the heat medium F is circulated to the heat exchanger 5 through the circulation flow path 74 to cause heat exchange between the heat medium F and the electrolyte B in the heat exchanger 5. Accordingly, the electrolyte B supplied to the electrochemical reaction device 2 is heated. In the electrolyte B using a strong alkaline aqueous solution, dissolved carbon dioxide is unlikely to be separated as a gas even when the temperature is raised, and the reaction speed of redox in the electrochemical reaction device 2 is improved by raising the temperature of the electrolyte B.

The homologation reaction device 4 may further include a known reactor that performs a hydrogenation reaction of an olefin obtained by multimerizing ethylene or an isomerization reaction of an olefin or paraffin, using hydrogen generated by the electrochemical reaction devices 2 and 100.

(Carbon Dioxide Treatment Method)

Hereinafter, a carbon dioxide treatment method using the carbon dioxide treatment apparatus 200 will be described. This carbon dioxide treatment method can be used in a method of producing carbon compounds such as olefins such as 1-hexene and paraffins such as i-hexane.

In the carbon dioxide treatment method using the carbon dioxide treatment apparatus 200, first, exhaust gas, the atmosphere, and the like are supplied to the concentration unit 11 as gas G1 and the carbon dioxide is concentrated to obtain the concentrated gas G2. As described above, since the absorption of carbon dioxide in the electrolyte A in the absorption unit 12 assists the concentration, it is not necessary to concentrate the carbon dioxide to a high concentration in the concentration unit 11. The carbon dioxide concentration of the concentrated gas G2 can be appropriately set, and can be, for example, 25 to 85% by volume.

A part of the concentrated gas G2 is supplied from the concentration unit 11 to the absorption unit 12 and is brought into contact with the electrolyte A, and the carbon dioxide in the concentrated gas G2 dissolves and is absorbed in the electrolyte A. The electrolyte B in which carbon dioxide dissolves is in a weak alkaline state. Further, the electrolyte B is supplied from the absorption unit 12 to the heat exchanger 5 via the storage unit 32, and the electrolyte B heated by heat exchange with the heat medium F is supplied to the electrochemical reaction device 2. The temperature of the electrolyte B supplied to the electrochemical reaction device 2 can be appropriately set, and can be, for example, 65 to 105° C.

The electrolyte B flows through the liquid flow path 23a of the electrochemical reaction device 2, the electric power is supplied from the power storage device 3 to the electrochemical reaction device 2, and a voltage is applied between the cathode 21 and the anode 22. Then, at the cathode 21, the dissolved carbon dioxide in the electrolyte B is electrochemically reduced to generate carbon compounds, and water is reduced to generate hydrogen. At this time, at the anode 22, the hydroxide ions in the electrolyte B are oxidized to generate oxygen. The amount of dissolved carbon dioxide in the electrolyte B decreases as the reduction proceeds, and the electrolyte A in a strong alkaline state flows out of the outlet of the liquid flow path 23a. The gaseous products C generated by the reduction permeate the gas diffusion layer of the cathode 21, flow out of the electrochemical reaction device 2 through the gas flow path 24a, and are fed to the homologation reaction device 4.

Further, a part of the concentrated gas G2 is supplied from the concentration unit 11 to the concentration unit 13. In order to supply carbon dioxide as a gas to the electrochemical reaction device 100, there is no concentration assist due to the absorption of carbon dioxide to the electrolyte A as in the absorption unit 12, and thus the carbon dioxide of the concentrated gas G2 obtained in the concentration unit 11 is further concentrated in the concentration unit 13 to obtain the concentrated gas G3. The carbon dioxide concentration of the concentrated gas G3 can be appropriately set, and can be, for example, 80 to 100% by volume.

In the electrochemical reaction device 100, as described above, the first reaction unit 110 and the second reaction unit 120 electrochemically reduce carbon dioxide gas and dissolved carbon dioxide. Accordingly, it is possible to increase the ethylene concentration in the gaseous products C.

The gaseous products C containing ethylene generated by reducing carbon dioxide in the electrochemical reaction device 2 and the electrochemical reaction device 100 is fed to the reactor 41, and is brought into gas phase contact with the olefin multimerization catalyst in the reactor 41 to multimerize ethylene. Accordingly, an olefin in which ethylene is multimerized can be obtained. For example, when an olefin having 6 or more carbon atoms is used as a target carbon compound, the generated gas D emitted from the reactor 41 is fed to the gas-liquid separator 42 and cooled to approximately 30° C. Then, the target olefin having 6 or more carbon atoms (for example, 1-hexene) is liquefied, and the olefin having less than 6 carbon atoms remains as a gas. Thus, it is possible to easily separate off the olefin liquid E1 (target carbon compound) and the olefin gas E2. The number of carbon atoms of the olefin liquid E1 and the olefin gas E2 to be gas-liquid separated can be adjusted by the temperature of the gas-liquid separation.

The olefin gas E2 after gas-liquid separation can return to the reactor 41 and be reused for the multilayer reaction. In this manner, when an olefin having a smaller number of carbon atoms than that of the target olefin is circulated between the reactor 41 and the gas-liquid separator 42, it is preferable to adjust the contact time between a raw material gas (a mixed gas of the gaseous products C and the olefin gas E2) and the catalyst in the reactor 41, and to control the conditions under which each molecule causes an average of one multilayer reaction. Accordingly, an unintentional increase in the number of carbon atoms of the olefin generated in the reactor 41 is suppressed, and thus, the gas-liquid separator 42 can selectively separate off the olefin having a desired number of carbon atoms (olefin liquid E1).

According to such a method, valuable resources can be efficiently obtained from a renewable carbon source with high selectivity. Therefore, it does not require a large-scale refining facility such as a distillation column required in conventional petrochemistry using the Fischer-Tropsch (FT) synthesis method or the MtG method, and is economically advantageous overall.

In addition, an aspect of using the electrochemical reaction device according to an aspect of the present invention is not limited to the carbon dioxide treatment apparatus 200 described above. The reduction of carbon dioxide in the electrochemical reaction device also generates ethanol. Therefore, for example, the carbon dioxide treatment apparatus 200 may include an ethanol purification device instead of the homologation reaction device 4 and the heat exchanger 5, and may further include an ethanol purification device in addition to the homologation reaction device 4 and the heat exchanger 5. In this case, since ethanol is discharged from the electrochemical reaction device as a mixed solution with the electrolyte A, the ethanol and the electrolyte A can be separated by a distillation column and a gas-liquid separator in the ethanol purification device.

Further, the carbon dioxide treatment apparatus 200 may not include a homologation reaction device and a heat exchanger. Further, the electrochemical reaction device and the power storage device do not share the electrolyte, and the electrolyte may be circulated only between the absorption unit of the capturing device and the electrochemical reaction device.

In addition, it is appropriately possible to replace the configuration elements in the above-described embodiment with well-known configuration elements without departing from the spirit of the present invention, and the above-described modification examples may be appropriately combined.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Capturing device
2 Electrochemical reaction device
3 Power storage device
4 Homologation reaction device
5 Heat exchanger
100 Electrochemical reaction device
110 First reaction unit
111 First cathode
112 First anode
113 First liquid flow path
114 First gas flow path
115 First gas discharge path
116 First liquid flow path closing means
117 First gas flow path closing means
120 Second reaction unit 121 Second cathode
122 Second anode
123 Second liquid flow path
124 Second gas flow path
125 Second gas discharge path
126 Second liquid flow path closing means
127 Second gas flow path closing means
141 First liquid solenoid valve
142 Second liquid solenoid valve
143 Third liquid solenoid valve
144 First gas solenoid valve
145 Second gas solenoid valve
146 Third gas solenoid valve
151 Pressure sensor
152 Carbon dioxide sensor
153 Ethylene sensor
200 Carbon dioxide treatment apparatus

What is claimed is:

1. An electrochemical reaction device that electrochemically reduces carbon dioxide, comprising:
a first reaction unit; and
a second reaction unit provided on a downstream side of the first reaction unit,
a second gas solenoid valve and
a second liquid solenoid valve, wherein
the first reaction unit includes a first cathode, a first anode, a first liquid flow path provided between the first cathode and the first anode for supplying an electrolyte composed of a alkaline aqueous solution with a pH greater than 7, a first gas flow path provided on a side of the first cathode opposite to the first anode for supplying carbon dioxide gas, a first liquid flow path closing means for closing a gate of the first liquid flow path in an openable and closable manner, a first gas flow path closing means for closing a gate of the first gas flow path in an openable and closable manner, and
the second reaction unit includes a second cathode, a second anode, a second liquid flow path provided between the second cathode and the second anode for supplying the electrolyte from the first liquid flow path, a second gas flow path provided on a side of the second cathode opposite to the second anode, a second liquid flow path closing means for closing a gate of the second liquid flow path in an openable and closable manner, and a second gas flow path closing means for closing a gate of the second gas flow path in an openable and closable manner,
the first gas flow path closing means is positioned at a longitudinal end of the first gas flow path opposite to the second gas flow path,
the first liquid flow path closing means is positioned at a longitudinal end of the first liquid flow path opposite to the second liquid flow path,
the second gas flow path closing means is positioned at a longitudinal end of the second gas flow path opposite to the first gas flow path,
the second liquid flow path closing means positioned at a longitudinal end of the second liquid flow path opposite to the first liquid flow path,
the second gas solenoid valve is provided at the boundary part between the first gas flow path and the second gas flow path, and
the second liquid solenoid valve is provided at the boundary part between the first liquid flow path and the second liquid flow path.

2. A method of electrochemically reducing carbon dioxide, the method comprising:
a step of electrochemically reducing carbon dioxide gas and dissolving unreacted carbon dioxide gas in an electrolyte in a state where the electrolyte composed of a alkaline aqueous solution with a pH greater than 7 is accommodated in a first liquid flow path in which a liquid solenoid valve between a first cathode and a first anode are closed, and the carbon dioxide gas is accommodated in a first gas flow path in which a gas solenoid valve on a side of the first cathode opposite to the first anode is closed;
a step of transferring the electrolyte with dissolved carbon dioxide gas to a second liquid flow path from the first liquid flow path by opening the liquid solenoid valve; and
a step of electrochemically reducing dissolved carbon dioxide in the electrolyte in the second liquid flow path by moving the electrolyte in which carbon dioxide dissolves from the first liquid flow path to the second liquid flow path between a second cathode and a second anode, wherein
the first liquid flow path and the second liquid flow path are connected in series in a longitudinal direction via the liquid solenoid valve.

3. The method of reducing carbon dioxide according to claim 2, wherein
an average value of voltages applied between the first cathode and the first anode during the reduction of the carbon dioxide gas is set to be lower than an average value of voltages applied between the second cathode and the second anode during the reduction of the dissolved carbon dioxide.

4. A method of producing carbon compounds by electrochemically reducing carbon dioxide by using the method of reducing carbon dioxide according to claim 2.

* * * * *